United States Patent
Danielson et al.

(10) Patent No.: US 7,944,895 B2
(45) Date of Patent: May 17, 2011

(54) METHODS AND APPARATUSES FOR ALLOCATING TIME SLOTS TO CIRCUIT SWITCHED CHANNELS

(75) Inventors: Magnus Danielson, Stocksund (SE); Per Lindgren, Stockholm (SE); Thomas Wahlund, Enskede (SE)

(73) Assignee: Net Insight Intellectual Property AB, Stockholm (SE)

( * ) Notice: Subject to any disclaimer, the term of this patent is extended or adjusted under 35 U.S.C. 154(b) by 0 days.

(21) Appl. No.: 12/341,942

(22) Filed: Dec. 22, 2008

(65) Prior Publication Data

US 2009/0168797 A1 Jul. 2, 2009

Related U.S. Application Data

(63) Continuation of application No. 09/673,423, filed as application No. PCT/SE99/00605 on Apr. 16, 1999, now Pat. No. 7,496,112.

(30) Foreign Application Priority Data

Apr. 17, 1998 (SE) ...................................... 9801335

(51) Int. Cl.
*H04J 3/00* (2006.01)
*H04B 7/212* (2006.01)
(52) U.S. Cl. ................. 370/337; 370/395.42; 370/444
(58) Field of Classification Search ............... 370/230.1, 370/235, 337, 389, 395.4, 395.42, 442, 444
See application file for complete search history.

(56) References Cited

U.S. PATENT DOCUMENTS

| | | | | |
|---|---|---|---|---|
| 5,235,599 A | * | 8/1993 | Nishimura et al. | 714/4 |
| 5,491,691 A | * | 2/1996 | Shtayer et al. | 370/395.42 |
| 5,734,867 A | * | 3/1998 | Clanton et al. | 370/461 |
| 5,790,551 A | * | 8/1998 | Chan | 370/458 |
| 5,933,422 A | * | 8/1999 | Kusano et al. | 370/331 |
| 5,982,780 A | * | 11/1999 | Bohm et al. | 370/450 |
| 6,034,960 A | * | 3/2000 | Beshai et al. | 370/395.4 |
| 6,205,154 B1 | * | 3/2001 | Schmidt et al. | 370/458 |
| 2003/0058817 A1 | | 3/2003 | Asai | |

FOREIGN PATENT DOCUMENTS

| | | |
|---|---|---|
| JP | 08-149102 | 6/1996 |
| JP | 09-116556 | 5/1997 |
| JP | 11-150577 | 6/1999 |

OTHER PUBLICATIONS

Patent Abstract of Japan for JP Pat. Pub. No. JP 11-150577.
Patent Abstracts of Japan for JP Pat. Pub. No. JP 09-116556.
Patent Abstracts of Japan for JP Pat. Pub. No. JP 08-149102.

* cited by examiner

*Primary Examiner* — Donald L Mills
(74) *Attorney, Agent, or Firm* — Haynes and Boone, LLP; Michael Shenker

(57) ABSTRACT

The present invention relates to methods and apparatuses for allocating time slots to circuit-switched channels established to comprise one or more respective time slots in a recurrent frame of a time division multiplexed network. According to the invention, a time slot allocated to said channel is associated with a selected level, of at least two available levels of priority. Decisions as to whether or not to deallocate said time slot from said channel is then based upon a comparison of said selected level of priority and a level of priority associated with a request for a time slot for another channel.

22 Claims, 6 Drawing Sheets

| SL | CH | PR |
|---|---|---|
| 3 | B | H |
| 4 | B | H |
| 5 | B | S |
| 6 | B | S |
| 7 | B | S |
| 8 | B | S |
| 9 | B | S |
| 10 | B | S |
| 11 | B | S |
| 12 | B | S |
| 13 | F | - |

*FIG. 6A*

| SL | CH | PR |
|---|---|---|
| 3 | B | H |
| 4 | B | H |
| 5 | B | S |
| 6 | B | S |
| 7 | B | S |
| 8 | B | S |
| 9 | B | S |
| 10 | B | S |
| 11 | B | S |
| 12 | C | H |
| 13 | C | H |
| 14 | C | H |
| 15 | C | H |

*FIG. 6B*

| SL | CH | PR |
|---|---|---|
| 1 | A | R |
| 2 | A | R |
| 14 | F | - |
| 15 | F | - |

*FIG. 6C*

| SL | CH | PR |
|---|---|---|
| 1 | A | R |
| 2 | A | R |

*FIG. 6D*

METHODS AND APPARATUSES FOR ALLOCATING TIME SLOTS TO CIRCUIT SWITCHED CHANNELS

CROSS-REFERENCE TO RELATED APPLICATIONS

This application is a continuation of U.S. patent application Ser. No. 09/673,423 filed Feb. 1, 2001, which application is the national stage of International Application No. PCT/SE99/00605 filed Apr. 16, 1999 designating the United States, which claims priority of Swedish Patent Application No. 9801335-2 filed Apr. 17, 1998, which is hereby incorporated by reference in its entirety.

TECHNICAL FIELD OF INVENTION

The present invention relates methods and apparatuses for allocating time slots to circuit-switched channels established to comprise one or more respective time slots in a recurrent frame of a time division multiplexed network.

TECHNICAL BACKGROUND AND PRIOR ART

Today, new types of communication networks are being developed for the transfer of information in circuit-switched channels of time division multiplexed networks. In such a network, a recurrent frame of the network is divided into time slots, and said circuit-switched channels are established to comprise respective one or more time slots of said recurrent frame. Hence, each channel will be allocated a respective set of one or more time slots within said recurring frame, thereby gaining exclusive write access to said respective set of time slots.

One example of such a network is the so-called DTM network (DTM—Dynamic Synchronous Transfer Mode). DTM is a broadband network architecture (see e.g. Christer Bohm, Per Lindgren, Lars Ramfelt, and Peter Sjödin, The DTM Gigabit Network, Journal of High Speed Networks, 3(2), 109-126, 1994, and Lars Gauffin, Lars Håkansson, and Bjorn Pehrson, Multi-gigabit networking based on DTM, Computer Networks and ISDN Systems, 24(2), 119-139, April 1992).

Prior art describes rules for deciding, at a node of such a network, when the node shall give away write access to time slots to other nodes, i.e. to deallocate time slots in the favor of other nodes. For example, as disclosed in WO 97/36402, a node will give away time slots if it has any free slots available, i.e. slots not allocated to any one of the end users served by said node. However, in many cases there will be a need for more flexible rules, providing more options in the control of allocation and deallocation of time slots. Also, in this prior art, a resource shortage problem will occur if there are no free slots available in the frame of interest to respond to a request for additional slots transfer capacity.

OBJECT OF THE INVENTION

An object of the invention is to provide a more flexible, yet simple, way of controlling the allocation and deallocation of time slots to channels, also taking into consideration for example the situation when there are no free slots available.

SUMMARY OF THE INVENTION

The above mentioned and other objects are accomplished by the invention as defined in the accompanying claims.

Hence, according to a first and a second aspect of the invention, there is provided a method and a device, respectively, of the kind mentioned in the introduction, wherein a time slot allocated to a channel is associated with a selected level, of at least two available levels, of priority. Decisions as to whether or not to deallocate said time slot from said channel is then made based upon a comparison of said selected level of priority and a level of priority associated with a request for a time slot for another purpose, such as for another channel.

If for example time slots allocated to channel A and have been associated with a low level of priority, which may also be referred to as the priority by which channel A "owns" said time slots, another channel B that needs more resources, and cannot be satisfied by free slots, may then force deallocation of the allocated slots from channel A for use in channel B if its request refers to higher level of priority than the level of priority than the time slots allocated to channel A has been associated with.

As is understood, a request of this kind may be both generated as well as accommodated at one single point or node in the network, the accommodation of said request thus not requiring any sending of requests to other points or nodes of the network. However, the accommodation of said request may of course also involve the sending of said request to other points or nodes of the network.

According to an embodiment of the invention, the invention of course not being limited thereto, when using the invention in a situation wherein request of the above mentioned kind is transmitted between points or nodes of a network, only free slots is reallocated among nodes to accommodate the request if the request is sent to another node, i.e. the priority associated with a request is ignored in such a case, thus simplifying operation at said another node. The priority associated with said request is in such an embodiment only considered when allocating slots between channels handled by the one single node or at one single point in the network.

However, according to an alternative embodiment of the invention, when using the invention in a situation wherein a request of the above mentioned kind is transmitted between points or nodes of the network, time slots already allocated to channels handled by other nodes may be reallocated among nodes to accommodate the request, thereby making it possible to have the priority associated with a request affect the decisions made at other node, which may be advantageous for example when establishing multi-hop channels.

An advantage of the invention is thus that it allows for the use of resources allocated to circuit-switched channels in a more flexible way. If, for example, there are free resources existing in a frame, i.e. free, non-allocated time slots, these may be used temporarily by a first channel at a low priority until a second channel with a higher prioritized need for these resources appears. The resources will then be deallocated from the first channel and allocated to the second channel. Resources may thus by used by merely best-effort requiring channels (circuits) without the risk of blocking higher prioritized channels. The scheme therefore provides a possibility to use the resources more efficiently in the case of best-effort traffic, such as data traffic, in a circuit-switched network.

The decision as to which level of priority to select for the time slots of a channel may be based upon many different kinds of information. For example, a network operator may manually designate a level of priority when establishing a channel. Alternative, according to preferred embodiments of the invention, the level of priority may be automatically selected based upon the identity of a physical or virtual port, interface, or user, to/from which traffic pertaining to the channel is delivered, or based upon the type of application that the traffic transported in said channel pertains to. For example, a high priority may be given to channels carrying traffic pertaining to real-time applications, such as real-time voice or video applications, whereas a lower priority may be given to bursty data traffic. Also, according to another embodiment, the priority selected for a channel according to the invention may be automatically selected based upon priority information derived from overlying network protocols. For example, if an overlaying network protocol refers to the sending of packets having priority information included in the packet header, such priority information may be used to select a priority for a circuit-switched channel in which said packets are to be transported.

Another advantage of the invention is that it provides a scheme that will allow network operators to offer different user service classes to its end user or customers. For example, a high service class, providing access to channels that are allocated time slots associated with a high level of priority and consequently provide more reliable access to bandwidth, may be offered to customers having such needs, such as television broadcasting companies, whereas a lower service class, providing access to channels that are allocated time slots associated with a low level of priority and consequently provide less reliable access to bandwidth, may be offered to customers having such limited needs.

As is understood, in alternative embodiments, there may be more than two levels of priority. Also, each level of priority, as well as each type of service class, may be associated with different kinds of characteristics. For example, the channel set up characteristics of a certain priority level may differ from the deallocation characteristics of said level. As an example, the characteristics of a first level may be such that a request referring to said first level will not have priority over a simultaneously provided request referring to a second level, even though a time slot already allocated to a channel at said first level of priority will not be deallocated as a result of a request referring to said second level of priority. Preferably, the characteristics of the different levels of priority may thus be selected and decided by the network operator and may even be customized based upon the expressed needs of the customer or end user.

The selected level of priority by which a channel owns a time slot is preferably decided at channel set-up. After the selected level of priority has been assigned to the slot it may however be subject to change during the lifetime of the channel as a consequence of changing bandwidth requirements. For instance, an end user requesting a channel may have low requirements as to when bandwidth is allocated to said channel, but may have high requirements as to the importance of an uninterrupted access once the requested bandwidth is allocated. This would then for example be accomplished by the sending of a request for bandwidth, said request being associated with a low level of priority, and by allocating, once the request has been met, time slots to said channel and assigning these time slots with a high level of priority.

A channel may have the same level of priority assigned to all its time slots. For example, in a preferred embodiment, the association of a channel with a selected level of priority will automatically imply association of the time slots allocated to said channel with said selected level of priority. A channel may however be allocated different time slots at different levels of priority. If for example a channel is set up with half of the time slots using the highest available priority level and the remaining time slots using a lower level of priority, the channel is always ensured it will keep a certain capacity, corresponding to the number of high priority time slots.

Time slots allocated to a channel may also be assigned different levels of priority at different parts of the network. For example, in a tree-like hierarchical bitstream structure, this may be used to ensure that the slots of the channel will be owned at a high priority in the larger trunks of the tree but at a lower priority at the leafs of the tree. For example, this feature will provide a very advantageous tool in the management of multicasted channels.

As is understood, there may be different strategies for deallocating time slots from channels having time slots all owned at the same priority level when there is an existing bandwidth shortage. For example, such strategies may follow rules such as: the last time slot allocated to any channel (at the given priority) will be deallocated first (i.e. stack type of strategy); the longest (in time) allocated time slot will be deallocated first (i.e. a FIFO type of strategy); deallocating slot in a round robin fashion (i.e. deallocate one time slot at a time from each channel); or deallocation in a manner which provides a best fit considering the time slot fragmentation on the bitstream of interest. Of course, these strategies will basically be no different than the ones that may be used in prior art, wherein slots are either unallocated, i.e. free, or allocated (without any choice of allocation strength, i.e. prioritization).

Also, since the invention relates to circuit-switched channels, note that the priority assignment according to the invention does not refer to the priority by which transmitted data is to be passed along through a network, i.e. the kind of priority used in packet switched networks and the like for ensuring priority in case of a blocking situation occurring somewhere along the packet travel path through the network. Instead, the priority levels according to the invention are used primarily in the management of channel set-up and of channel bandwidth changes in relation to circuit switched channels.

Although it has been stated above that a priority level according to the invention refers to the bond between a time slot and the channel to which said slot is allocated, it is to be understood that such a bond according to the invention may be realized using an assignment of a priority level explicitly referring to, for example, the bond between a time slot and an end user, between a channel and a node, between a channel and a user application, or the like.

The invention is advantageously used in the context of circuit-switched channels on links between nodes of a communication network in single- or multi-hop scenarios. When dealing with multi-hop channels, information on the priority of a channel is preferably transmitted from the originating node of said channel to downstream hop nodes switching said channel in order to maker sure that the downstream nodes treat the multi-hop channel with the appropriate priority. Also, in such a multi-hop scenario the nodes of the network may for example be set to operate according to the rule that a node is never allowed to tear down an already accepted and established switched channel, i.e. a channel that the "hop" node switches from one network link to another and for which the node is not the originating node that has determined and assigned the selected channel priority, no matter how high priority the hop node receives in requests pertaining to other channels. The invention is also advantageously used for providing interconnect channel prioritization when interconnecting ports of a time division multiplexing data switching or routing apparatus via internal circuit-switched channels. Also, the decisions as to allocate and deallocate time slots to/from channels may be performed in a distributed manner, incorporating exchange of messages between points of the network, or in a centralized manner. As an example of the latter, when interconnecting ports of a data switching or routing apparatus, one single component may in fact control all prioritization, allocation and deallocation, in accordance with the invention, within the entire apparatus.

The invention also provides an advantageous feature when it comes to link set-up and network redundancy. According to a preferred embodiment of the invention, the priority by which a channel is to be re-established in case of channel failure based upon said selected level over priority. Such a channel failure may for example be due to the fact that a link transporting said frame has temporarily gone down. When the link as back up, channels may be re-established in a highest-selected-level-of priority-first order. Also, the degree of redundancy to be used for a channel may also be determined based upon the level of priority selected for the time slots owned by said channel. These features will further expand network operator's possibilities when offering differentiated service classes to end users.

Also, note that the fact the a channel has allocated one or more time slots within a frame at a selected priority over a first network segment, meaning that it has the exclusive write access to said time slots over said first network segment, does not prohibit the feature of allowing said time slots to be allocated to other channels on other network segments over which said channel has not allocated the time slot, the latter situation often being referred to as "slot reuse".

Further aspects, objects and features of the invention will be understood more fully from the accompanying claims and from the following description of exemplifying embodiments thereof with reference to the accompanying drawings.

BRIEF DESCRIPTION OF THE DRAWINGS

Exemplifying embodiments of the invention will now be described with reference to the accompanying drawings, wherein:

FIG. 4b shows the time slot distribution among three levels of priority in accordance with the time slot allocation illustrated in FIG. 4a;

FIGS. 6a-6d show exemplifying slot utilization tables according to an embodiment of the invention.

DETAILED DESCRIPTION OF PREFERRED EMBODIMENTS

Figure 1:
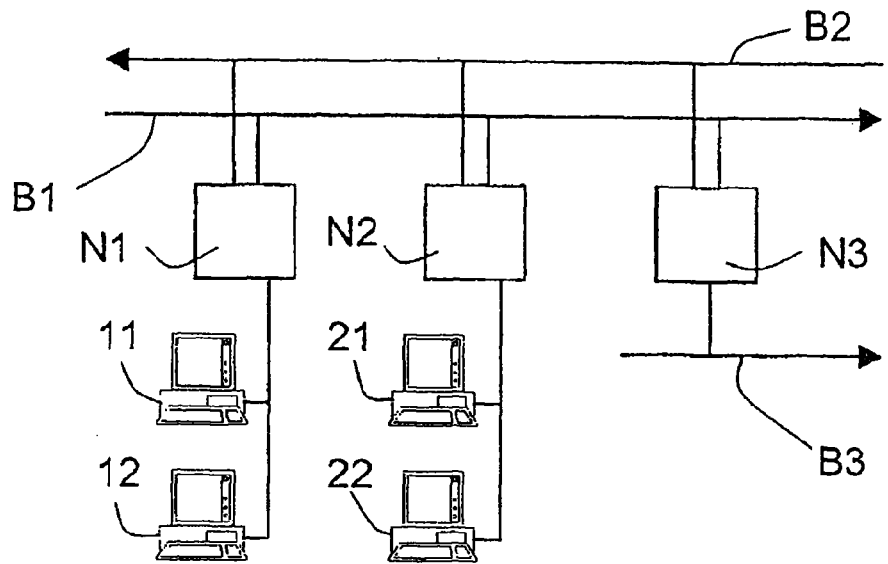
FIG. 1 schematically shows an exemplified network of the kind addressed by the invention.

FIG. 1 shows an exemplifying network topology of a time division multiplexed network of the kind addressed by the invention. The network in FIG. 1 comprises three nodes N1, N2 and N3, each connected to a bus having two unidirectional optical fibers B1 and B2 connecting all three nodes. The optical fiber B1 carries at least one bitstream used for communication in one direction along the bus, and the optical fiber B2 carries at least one bitstream used for communication in the other direction along the bus, as indicated in FIG. 1 by the arrows at the end of the optical fibers B1 and B2. Even though a simple two-way structure is exemplified in FIG. 1, the invention may just as well be used in relation to many other kind of network structures and network topologies. As will be described below, the communication on each optical fiber B1 and B2 is synchronous and time division multiplexed. In addition, wavelength division multiplexing, i.e. having each of the fibers carry more than one bitstream using different wavelengths, may be used to increase the network capacity.

As shown in FIG. 1, node N1 and N2 are arranged to serve end users by providing access to the optical fibers B1 and B2. Hence, two end users 11, 12 are connected to the first node N1, and two end users 21, 22 are connected to the second node N2. The third node is connected to a third optical fiber B3 and acts as a switch node within the network.

When, for example, the end user 11 connected to the first node N1 wants to send information to the end user 22 connected to the second node N2, the nodes N1 and N2 will establish a communication channel on a bitstream propagating on the optical fiber B1. Node N1 will then transfer data received from the sending end user 11 to the bitstream on the optical fiber B1, and node N2 will in turn transfer said data from the bitstream on the optical fiber B1 to the receiving end user 22. If information is to be passed from the end user 22 to the end user 11 as well, a similar channel is set up on a bitstream propagating on the optical fiber B2. In a similar manner, end users or node connected to the optical fiber B3 may be reached by establishment of similar channels via the switch node N3, said channels then sometimes being referred to as multi-hop channels. Even though the end users have been shown as computers or similar work stations in FIG. 1, it is understood that the end user may be any type of electronic equipment needing access to the network, such as printers, servers, facsimile machines, telephones, television sets, radio receivers, and the like. An end user may in fact also be an entire network, such as an Ethernet-based local area network. An end user may also be a virtual end user, such as a software application or a virtual port.

Figure 2:
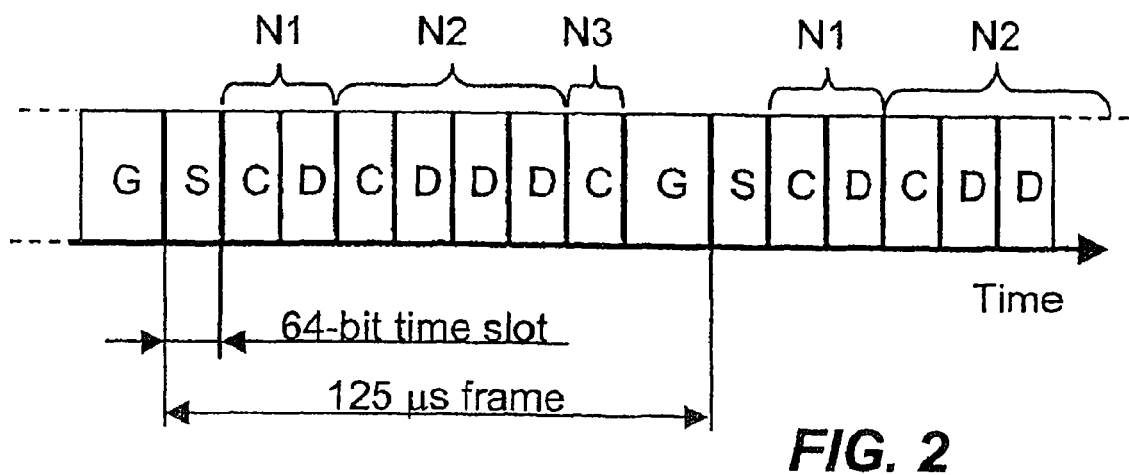
FIG. 2 schematically shows an exemplifying time division multiplexed bitstream propagating along one of the optical fibers shown in FIG. 1.

The structure of a time division multiplexed bitstream of the kind propagating on the optical fibers B1, B2 and B3 in FIG. 1 will now be exemplified with reference to FIG. 2. As illustrated in FIG. 2, the bandwidth of each wavelength, i.e. each bitstream, is in this example divided into 125 µs frames. Each frame is in turn divided into 64-bit time slots. The number of time slots within a frame thus depends on the network's bit rate. Consequently, the number of slots shown in the frame of the bitstream in FIG. 2 is merely illustrative, the actual number of slots within each frame typically being far greater than what is shown in FIG. 2.

The time slots of a recurrent frame are in this example divided into two groups, control slots C and data slots D. The control slots C are used for control signaling between nodes within the network, i.e. for carrying messages between nodes for the internal operation of the network, such as for channel establishment, time slot allocation, and the like. The data slots D are used for the transfer of user data, also referred to as payload data, between end users served by said nodes.

In addition to said control slots and data slots, each frame comprises one or more synchronization slots S used to synchronize the operation of each node in relation to each frame. Also, a guard band G is added after the last slot at the end of each frame in order to facilitate synchronization. As indicated in FIG. 2, the bitstream frame is repeated continuously.

Each node typically has access to at least one control slot C and to a dynamic number of data slots D. Each node uses its control slot C to communicate with other nodes within the network. The number of data slots D to which a node has access will typically depend upon the transfer capacity requested by the end users served by the respective node. When an end user requests a channel of a certain bandwidth, the node serving said end user will establish said channel by allocating a number the time slots that it has access to, said number corresponding to the requested bandwidth, to said channel. A node may also have access to data slots, which are not needed to satisfy the transfer capacity, requested by the users, i.e. that are not allocated to any channels. These slots are then referred to as non-allocated, or free, slots. If the end users at a certain node require a large transfer capacity, the node will allocate more data slots for that purpose, which may involve reallocation of free time slots among different nodes. On the other hand, if the end users at a certain node merely require a small transfer capacity, the node may limit the number of data slots that it has access to. However, a node may continue to have access to data slots that at the moment are not needed to satisfy the transfer capacity currently requested by the users. Also, the number of control slots to which each node has access to may be increased or decreased depending on the node's demand for signaling capacity. Hence, the number of data slots as well as control slots to which a node has access to may by dynamically adjusted as the network load changes.

As illustrated in the example of FIG. 2, the first node N1 has access to one control slot and one data slot. The second node N2 has access to one control slot and three data slots as a result of its end users currently having a greater need to transmit data. The third node N3 has merely access to a control slot and, at the moment, no data slots.

Figure 3:
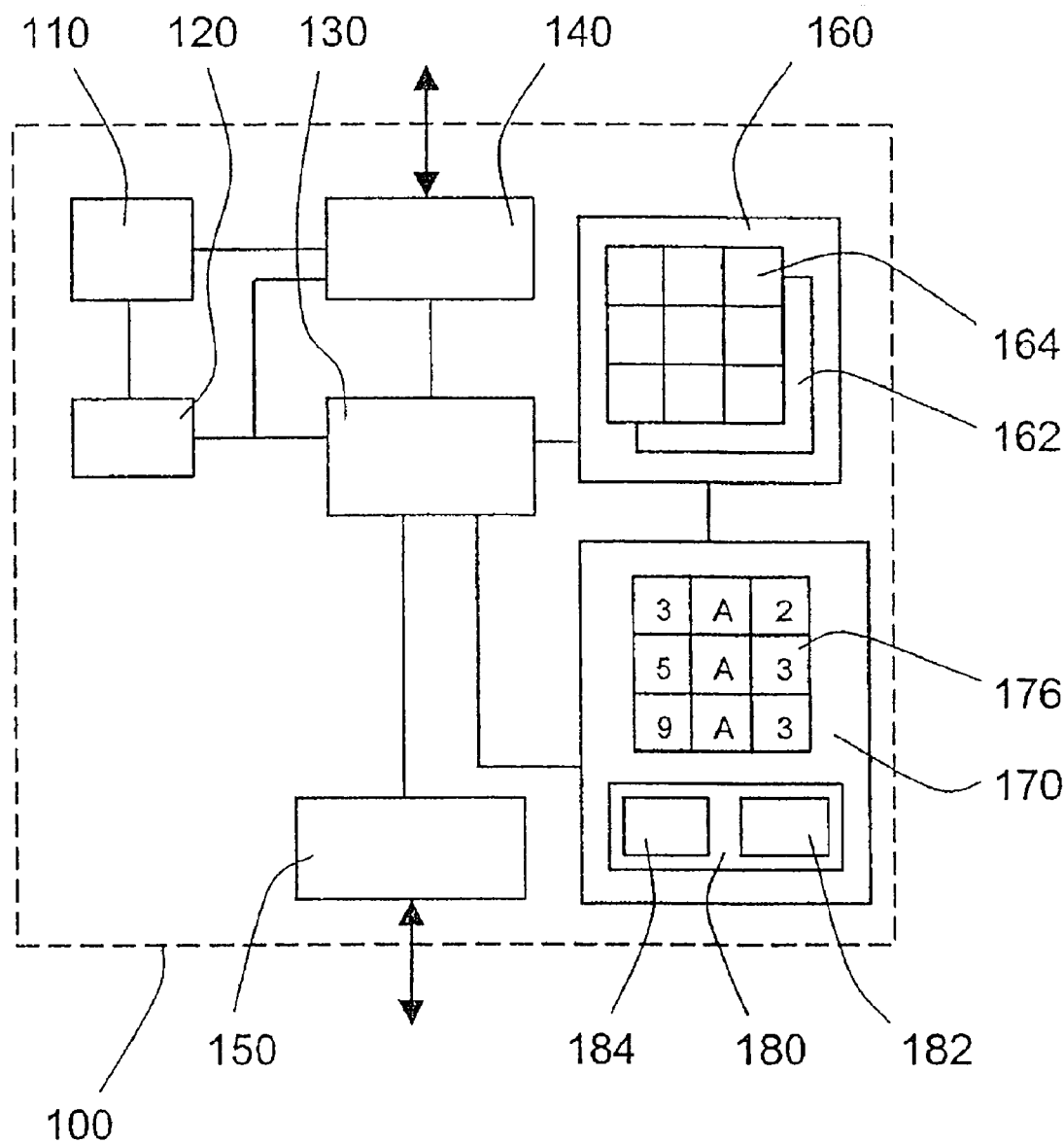
FIG. 3 schematically shows a block diagram of a node according to an exemplifying embodiment of an apparatus for allocating time slots according to the invention.

With reference to FIG. 3, an exemplifying embodiment of an apparatus for allocating time slots to a channel in accordance with the present invention will now be described. FIG. 3 shows the basic components of an exemplified network node 100 in a time division multiplexed network. This node could for example be any one of the nodes N1, N2 and N3 in FIG. 1. The node 100 comprises a synchronization detector 110, a time slot counter 120, a logic unit 130, a network interface 140, a user interface 150, a memory 160 and a node controller 170. The node controller 170 comprises a unit 180 for allocating time slots to a channel and a slot utilization table 176. The memory 160 comprises a write data table 162 and a read data table 164. The user interface 150 is connected to the end users attached to the node 100, such as the end users 11 and 12 in FIG. 1.

The synchronization detector 110 is arranged to derive a frame synchronization signal (designated S in FIG. 2) from the bitstream passing on an optical fiber (not shown) connected to the node 100 via the network interface 140. The frame synchronization signal is used to restart the time slot counter 120. The counter 120 will count the number of time slots passing on the optical fiber at a predefined bit rate and provide a corresponding signal to the logic unit 130 and the network interface 140. The logic unit 130 uses the signal from the counter 120 to keep track of which time slot within the frame that is currently being processed, and the network interface 140 uses the signal from the counter to synchronize the writing into, or the reading from, time slots of the passing bitstream.

The controller 170 is arranged to keep track of all required information as to the allocation of slots to different nodes and different channels. The controller is for example used when establishing new channels on behalf of end users connected to the user interface 150. The controller has specified in the write data table 162 of memory 170 in which slots the node may write control data and user data. In the read data table 164 of memory 170, the node controller has specified from which slots the node shall read control data and user data. Control data is transferred to the controller and user data is transferred to the appropriate user connected to the node. In the slot utilization table 176, the unit 180 for allocating slots to a channel has specified the level of priority at which the channel that the slot is allocated to owns the respective time slot. Different slots may be owned by different channels, or by the same channel, at different levels of priority, ranging from a highest priority level to a lowest priority level. In FIG. 3 it is for example specified in table 176 that time slot position three (3) is owned by channel A with a priority level two (2), that time slot five (5) is also owned by channel A but with a priority level three (3), and that time slot nine (9) is owned by a channel C also with a priority level three (3).

The unit 180 for allocating slots to a channel comprises priority assignment means 182 and slot allocating means 184. The priority assignment means 182 is arranged to associate a time slot owned by (or to be owned by), i.e. allocated to, a channel with a level of priority by means of writing information designating this level in the slot utilization table 176. The associated level in this example selected based upon a level indicated by an end user when the end user makes a request for either its initial bandwidth needs or for its changed bandwidth needs. The term "bandwidth needs" may in this context refer to the size of the bandwidth or the priority level of the bandwidth, or both. The slot allocating means 184 are arranged to request a time slot for a channel in need of bandwidth and to include a user selected level of priority in this request. The slot allocating means 184 are also arranged to receive any such a request from an end user connected to this node or from another node on behalf of an end user connected thereto and to handle such requests, as will be discussed further below.

Figure 4A:
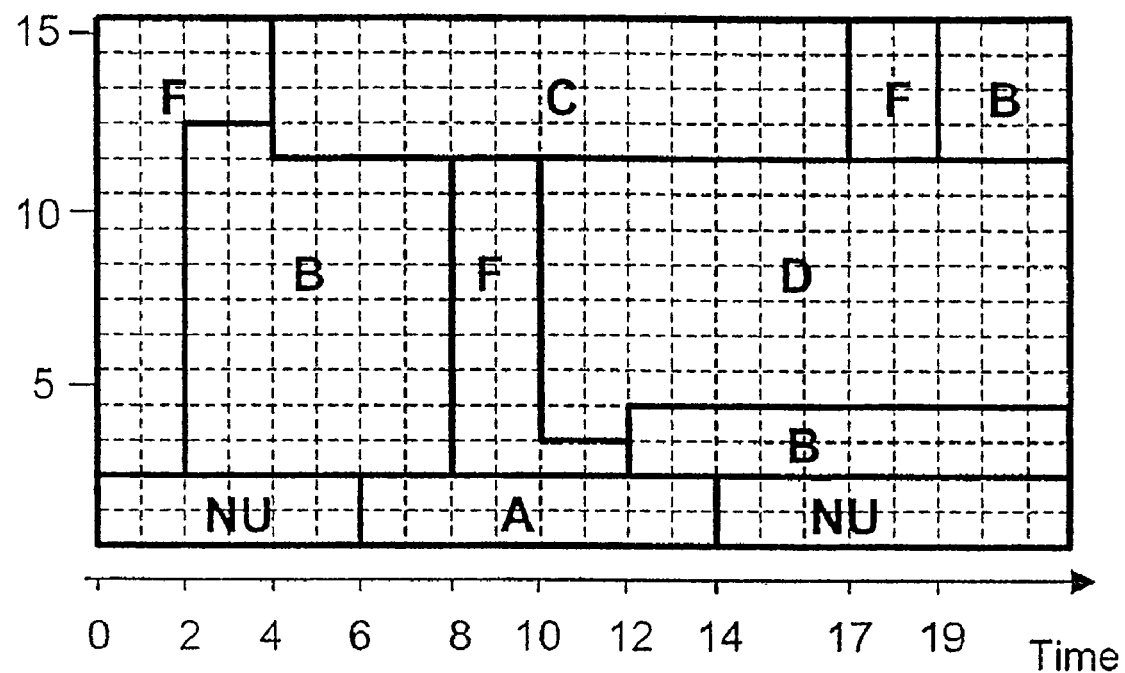
FIG. 4a shows an exemplifying time slot allocation diagram according to an embodiment of the invention.
Figure 4B:
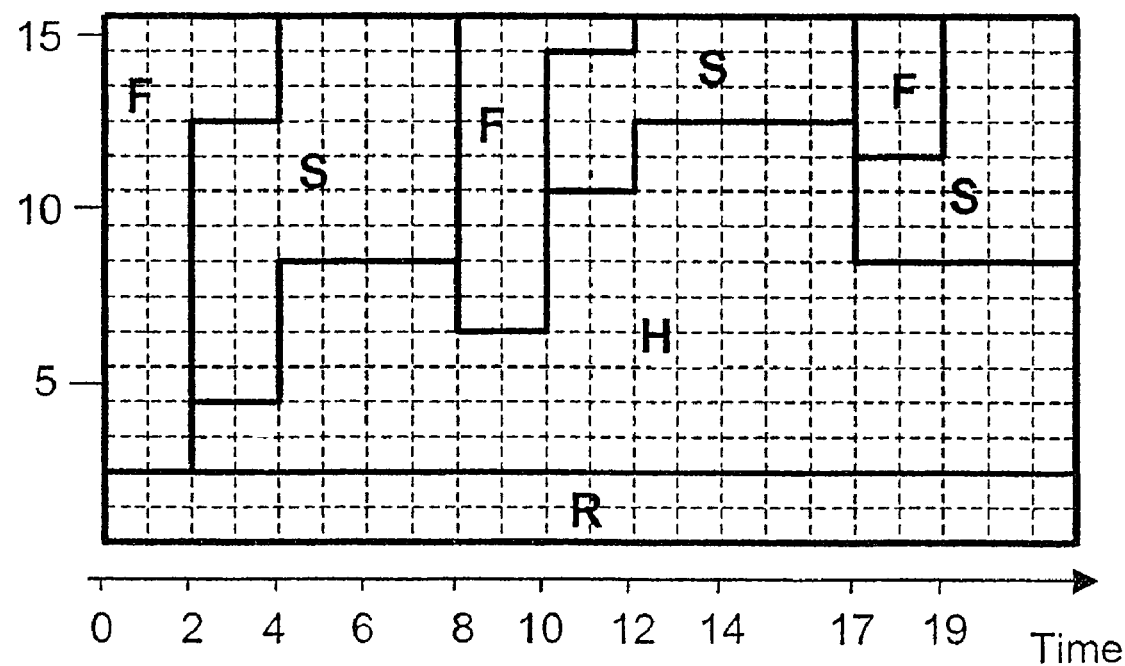

An exemplifying use of allocation and deallocation of time slots to channels, or end users, according to an embodiment of the invention will now be described with reference to FIGS. 4A and 4B. In this embodiment, a channel will own, i.e. be allocated to, a time slot at one of three different possible levels of priority. The three different levels have the following characteristics:

The highest level of priority is referred to as a "reserved" level, denoted R in FIG. 4B. A time slot owned allocated to a channel at this level of priority will be referred to as a "reserved" time slot. A reserved time slot will not, in this exemplifying embodiment, be deallocated from the channel as a result of a request for transfer capacity from another channel, user or node even if the channel for which said time slot is reserved is not using the time slot for transferring data. That is, a reserved time slot that is not in use will not become a free time slot. As an example, a leased line would comprise a number of reserved time slots.

The second highest level of priority is referred to as a "hard" level, denoted H in FIG. 4B. A time slot allocated to a channel at this level of priority will be referred to as a "hard" time slot. A hard time slot will, in this exemplifying embodiment, only be deallocated as a result of a request for a reserved time slot. Hence, neither a request for a soft time slot, to be described below, nor a request for a hard time slot will force a hard time slot to be deallocated. When a channel is done transmitting data in a hard time slot, the hard time slot is preferably deallocated and becomes a free slot.

The lowest level of priority is referred to as a "soft" level, denoted S in FIG. 4B. A time slot allocated to a channel at this level of priority will be referred to as a "soft" time slot. A soft time slot will, in this exemplifying embodiment, be deallocated as a result of a request for a reserved time slot or for a hard time slot. A request for a soft time slot can however not force a soft time slot to be deallocated. When a channel is done sending data in a soft time slot, the soft time slot may preferably be deallocated to become a free slot.

It should be noted that an alternative way to implement the highest level of priority, i.e. the reserved level, is to let reserved time slots that are temporarily not used by its owner for transferring data be temporarily borrowed by another channel, in which case the time slot will be immediately deallocated from this other channel as soon as the channel to which the time slot is reserved wants to use the slot.

FIG. 4A illustrates an exemplified allocation of fifteen (15) time slots in a frame of a bitstream. As discussed above, in FIG. 4a, a time slot is either free F or owned, i.e. allocated to, any one of channels A, B, C or D. A reserved time slot not being used by its owner is indicated NU (Not Used). In FIG. 4B the slot distribution among the different levels of priority is shown. Hence, FIG. 4B shows whether or not a time slot in the frame is free F or owned by a channel, and if owned by a channel, the level of priority by which said channel owns the respective time slot, i.e. a reserved level R, a hard level H, or a soft level S.

In this example, it is assumed that channel A will request two (2) reserved time slots, that channel B will request two (2) hard and eight (8) soft slots, that channel C will request four (4) hard slots, and that channel D will request four (4) hard and four (4) soft slots.

It should be noted that the time (horizontal) axis used in FIGS. 4A and 4B are merely for illustrating the relative order of certain actions affecting the allocation of time slots in the frame, and that the vertical axis indicates fifteen available time slot positions of an exemplifying recurring frame, synchronization slots and the like excluded.

At time t=0, it is assumed that channel A requests two reserved time slots, leaving the frame with thirteen free time slots. The transfer capacity of these two reserved slots is initially not used by channel A, as is indicated in the slot utilization of FIG. 4A.

At t=2, it is assumed that channel B requests two hard time slots and eight soft time slots. Since there are thirteen free slots in the frame, two hard slots and eight soft slots will be allocated to channel B to be owned by channel B in accordance with its request. In FIG. 4A it is seen that ten slots are now utilized by channel B, and in FIG. 4B it is seen that the frame now includes two reserved slots, two hard slots, eight soft slots and three free slots.

At t=4, it is assumed that channel C requests four hard time slots. The three free slots are therefore allocated to channel C as hard slots. In addition, one of the soft slots allocated to channel B is now deallocated, since these slots is owned by channel B at a lower level of priority as compared to the priority referred to by the request from channel C regarding a hard slot. The soft slot deallocated from channel B is allocated as a hard slot to channel C. In FIG. 4A it is seen that nine slots are now utilized by channel B and four slots by channel C, and in FIG. 4B it is seen that the frame now includes two reserved, six hard and seven soft slots.

At t=6, it is assumed that channel A starts using its transfer capacity that has previously been reserved. Then, at t=8, it is assumed that all slots allocated to channel B are deallocated and become free slots, as a result of the fact that the bandwidth need of channel B temporarily ends at this point in time. At t=10, it is assumed that channel D makes its bandwidth request for four hard slots and four soft slots, and eight of the nine free slots are therefore allocated to channel D.

At t=12, it is assumed that channel B ones again makes a request for two hard and eight soft slots. The one remaining free slot is then allocated to B as a hard slot and one of the soft slots allocated to D is deallocated and allocated to B as the second hard slot. However, channel B's request for eight soft slots cannot be met, and this part of the request has to be rejected.

At t=14, it is assumed that channel A stops using its reserved slots for transferring data. As previously described, these slots are however not deallocated but continue to be reserved for channel A. At t=17, it is assumed that channel C stops using its transfer capacity and its four hard slots are therefore deallocated to become free slots.

At t=19, it is assumed that channel B again tries to gain access to the whole size of its needed bandwidth. Since two hard slots are already allocated to channel B, the request will be for the additional eight soft slots. At this point, the four free slots will be allocated to B as soft slots while the request for the remaining four soft slots will still be rejected.

It is to be noted that the example discussed above may involve reallocation of time slots between nodes as well as within a node, and that the channels may for example include channels between nodes situated on the same link, between nodes situated on different links, i.e. multi-hop channels, or for example between ports of a single apparatus.

Flow diagrams of processing steps performed to exemplify management of allocation of time slots to a channel in accordance with an embodiment of the present invention will now be described with reference to FIGS. 5A and 5B.

Figure 5A:
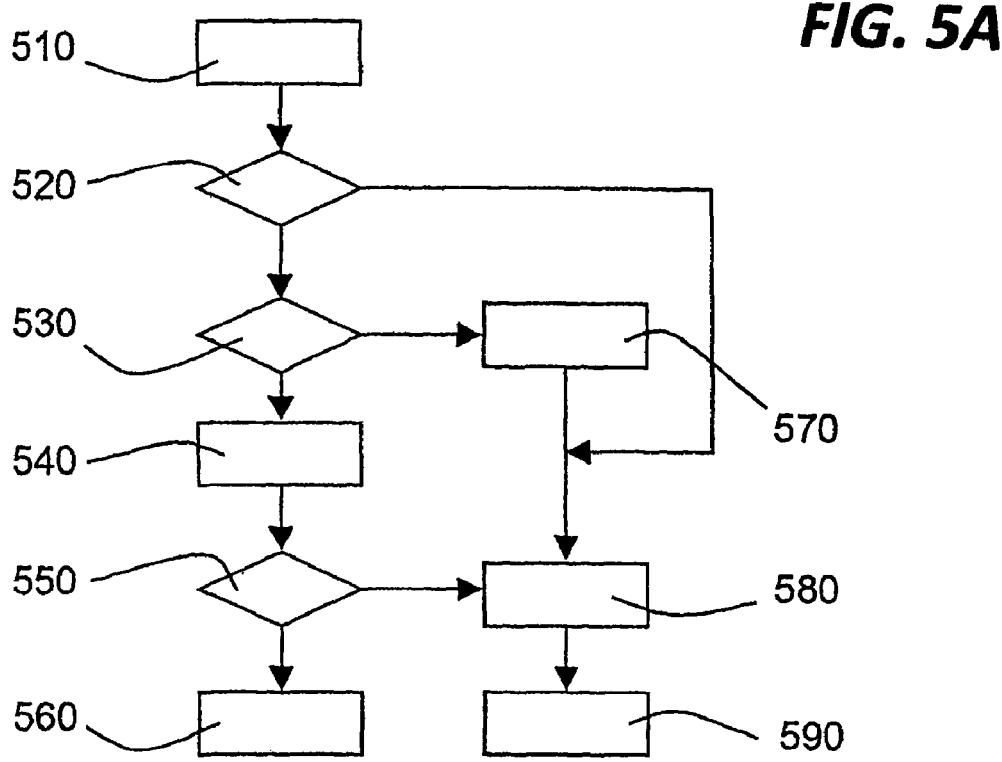
FIGS. 5a and 5b show flow diagrams according to an embodiment of the invention.

In FIG. 5A, the processing starts in step 510 with the reception of a request for a slot to be allocated to a channel at a designated selected level of priority. In FIG. 5A, it is assumed that the request comes from an end user connected to the node performing the illustrated steps.

In step 520, the node checks if there are any free slots available in its slot utilization table. If the answer is yes, the process continues to step 580 followed by step 590. In step 580, such a free slot is allocated to the requesting channel, and in the following step 590, the slot allocated in step 580 is associated with the selected level of priority. If however the answer in step 520 is no, the process continues to step 530.

In step 550, answers received as a result of the request transmitted to other nodes in step 540 are then examined. The answers will indicate whether or not the write access right to any slot may been transferred from another node to the node performing the steps in FIG. 5A. If the answer indicates that the access right to a slot has been transferred, steps 580 and 590 described above are performed with respect to these slots. If however no access right to a slot has been transferred, step 560 is executed. In step 560, the request for a slot with the selected level of priority is rejected.

As another example, if the process in FIG. 5A is performed in a system wherein the possibility of reallocating slots to/from "other nodes" does not exists, steps 540 and 550 will be omitted from the process. Thus, if no slot is found in step 530, the process will continue directly to step 560.

Figure 5B:
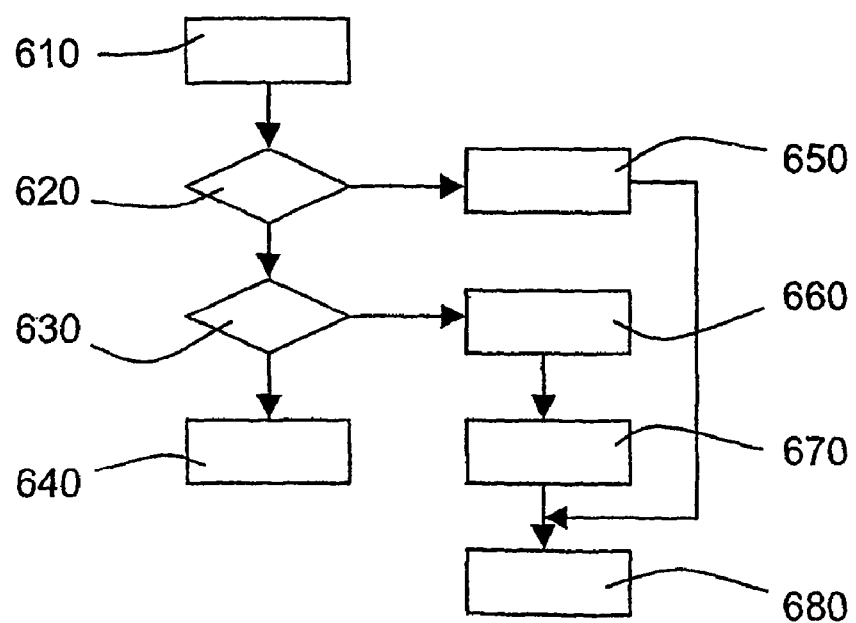

In FIG. 5B, the illustrated processing steps refer to the processing of a received request for a slot which should be assigned a selected level of priority, said request being derived from an end user connected to a different node than the one performing the illustrated steps, said request for example having been forwarded as a result of execution of step 540 in FIG. 5A.

The processing starts in step 610 with the reception of said request. After reception of the request, it is checked in step

620 whether or not there are any free slots available in the slot utilization table of the node that performs the steps in FIG. 5B. If the answer is yes, step 650 followed by step 680 are executed. Otherwise, step 630 is executed. In step 650, the node will initiate the transfer of the access right to a free slot to the node from which the request was received in step 610. In step 680, the transferred slot will be removed from the slot utilization table. However, if the answer is no in step 620, the process continuous to step 630. In step 630, the slot utilization table of the node is examined for any slots having a lower level of priority than the requested level. If such a slot is found, step 660 is processed. If no such slot exists, step 640 is processed.

In step 660, a slot found in block 630 is deallocated from the channel being the current owner of the slot. This deallocated slot is then processed in step 670 followed by step 680. In step 670, the node will initiate the transfer of the access rights to the slot deallocated in block 660 to the node from which the request in block 610 was received, and in step 680, the transferred slot will be removed from the slot utilization table. In step 640, having found no deallocatable slots given the priority level associated with the request, the request received in step 610 will be rejected.

Although the processes in FIGS. 5A and 5B have been described with reference to a request for one single slot, the steps for managing requests for a plurality of slots may be performed in a similar manner, and may for example include in-part request rejections if only a portion of the requested number of time slots is made available by the different processing steps.

FIGS. 6A to 6D show exemplifying slot utilization tables, in this example relating to the slot utilization described with reference to FIGS. 4A and 4B, using the same denotation as in FIGS. 4A and 4B to designate priority levels. Each table includes a column SL designating time slot positions, a column CH designating the channel that the respective time slot is allocated to, and a column PR that designates the priority at which the respective slot is allocated to the respective channel. These slot utilization tables are in this example of the kind previously described with reference to FIG. 3. It is assumed that FIGS. 6A and 6C show the slot utilization table of a first node at respective points in time (t=3 and t=5, respectively, in FIG. 4A) and that FIGS. 6B and 6D show the slot utilization table of a second node at said respective points in time. It is also assumed that channel A is established from the second node and that channels B and C are to be established from the first node.

At a time corresponding to t=3 of the diagram described in FIG. 4A, the first and second node have the slot utilization tables seen in FIGS. 6A and 6B, respectively. At t=4 in FIG. 4A, channel C, which is to be established by the first node, requests four hard slots. In FIG. 6A, it is seen that the first node prior to this request only has access to one free slot and that node N2 has access to two free slots.

FIGS. 6A to 6D illustrate the consequences of the processing steps performed by the node controllers in the first and second nodes. When the node controller of first node receives the request for four hard slots for channel C at time t=4, it first allocates the free slot it has access to, in this case slot thirteen (13), to the channel and assigns it the selected "hard" level of priority received in the request. This still leaves three hard slots to be allocated to meet the request. The node controller in the first node then forwards a request for three hard slots to the second node. Since the second node has two free slots, slots fourteen (14) and fifteen (15), it will as a result of the request transfer the access to these two slots to the first node. The node controller of the first node will then allocate these two slots as hard slots to channel C. This still leaves one hard slots to be allocated to meet the request. The first node will therefore examine its slot utilization table for a slot owned with a lower ownership level than the requested ownership level to fulfill the request of channel C, find one of the soft slots allocated to channel B, for example slot twelve (12), deallocate this slot from channel B, and allocate it to channel C as a hard slot. In all, after the request from channel C has been met in this manner, at time t=5, the first and second nodes will have the slot utilization tables shown in FIGS. 6C and 6D, respectively.

As is noted, in this example, all free slots, regardless of what nodes that have access to those free slots, are utilized before a slot owned at a level of priory is deallocated on behalf of a request for a slot to be owned with a higher level of priority, which differs somewhat as compared to the process described above with reference to FIGS. 5A and 5B.

Figure 7:
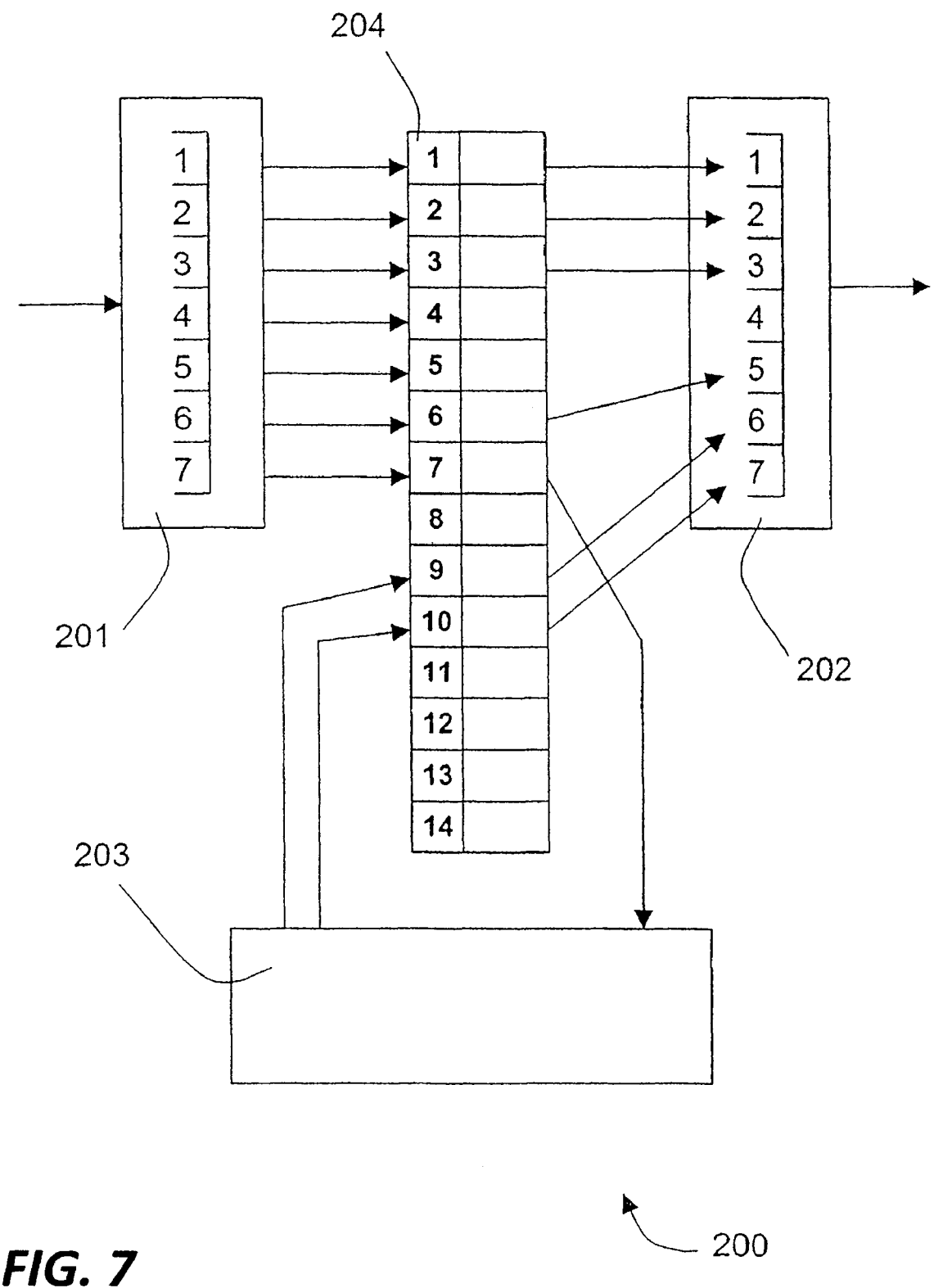
FIG. 7 schematically shows a switching and routing apparatus according to yet another embodiment of the invention.

FIG. 7 schematically shows a data switching and routing apparatus 200 operating according to yet another embodiment of the invention.

The apparatus 210 comprises input ports 201, output ports 202, a switch core implemented as a shared frame memory 204, and a routing processor 203.

The input ports 201 are arranged to receive data, for example in the form of Ethernet packets or traditional telephony traffic, and to write said data, divided into time slots, into entries of the frame memory 204. Similarly, the output ports 202 are arranged to read time slot data from entries of the frame memory 204 and to transmit said data, typically encapsulated according to the communication protocol used at the respective port, on output links. Each one of the input/output ports could be a physical port arranged to receive/transmit data in relation to a respective physical link. One or more of the input/output ports could however alternatively be a virtual port, for example arranged to receive/transmit data on a physical input/output link that also carries data pertaining to other virtual ports.

The routing processor 203 is arranged to select which entries of the memory 204 that the input ports 201 and the routing processor 203 shall write data into, and which entries of the memory 204 that the output ports 202 and the routing processor 203 shall read data from, thereby forming an interconnect network of circuit-switched channels through the memory 204. In FIG. 7, such mapping are indicated by arrows. The routing processor 203 also performs routing of data packets received, following said mapping, from one or more of the input ports via the memory 204. In addition, routing information gained by the routing processor is used to modify said mapping, thereby modifying which channels that goes where within the apparatus 200, the size of said channels, or the like. Furthermore, the routing processor 203 is arranged to assign a level of priority to each such channel that is set up through the memory 204. And when there is a request for a change in the allocation of such channels, this priority assignment will be taken into consideration in accordance with the invention.

The embodiment described with reference to FIG. 7 hence exemplifies the invention in use in a situation wherein all priority information as well as all decisions and priority assignments based thereupon (within the interconnect network) is essentially controlled by one single unit, i.e. the routing processor.

Even though the invention has been described with reference to exemplifying embodiments thereof, these are not to be considered as limiting the scope thereof, and, as understood by those skilled in the art, different modifications and alterations may be made within the scope of the invention, which is defined by the accompanying claims.

The invention claimed is:

1. In a first node which is one of a plurality of nodes of a time division multiplexed network, wherein a bitstream divided into frames is propagating in said time division multiplexed network, wherein a recurrent frame of said frames is divided into time slots, and wherein circuit-switched channels are respectively allocated a set of time slots in said recurrent frame, each set of time slots comprising at least one time slot, a method for allocating time slots to channels in the network, the method comprising:
    associating, with a selected level of priority, a set of time slots allocated to a circuit-switched first channel, the selected level of priority being one of at least two available levels of priority;
    receiving at the first node, from a requester being one of an end user and another node, a request for time slots in said recurrent frame for a circuit-switched second channel;
    checking, at the first node, for available time slots, comprising checking for free time slots, and, if the number of free time slots is to low, checking for deallocatable time slots;
    wherein said checking for deallocatable time slots comprises:
    determining whether or not there are deallocatable time slots on said circuit-switched first channel, based upon a comparison of said selected level of priority and a level of priority associated with the request for time slots for the circuit-switched second channel;
    if the number of available time slots is sufficient, and the first node is an intermediate node, then:
        pre-reserving said available time slots;
        forwarding the request to a next node; and
        upon receiving a confirmation from the next node, allocating said pre-reserved available time slots, and sending a confirmation to the requester; and
    if the number of available time slots is sufficient, and the first node is a destination node, then allocating the requested number of slots and sending a confirmation to the requester.

2. A method as claimed in claim 1, wherein said determining whether or not to deallocate the remaining number of requested time slots from said circuit-switched first channel comprises determining to deallocate said remaining number of time slots from said circuit-switched first channel if said request is associated with a higher level of priority than said selected level of priority.

3. A method as claimed in claim 1, wherein said determining whether or not to deallocate the remaining number of requested time slots from said circuit-switched first channel comprises determining to deallocate said remaining number of time slots from said circuit-switched first channel if said request is a request for a time slot to be allocated to another channel with a higher level of priority than said selected level of priority.

4. A method as claimed in claim 1, wherein said determining whether or not to deallocate the requested number of time slots from said circuit-switched first channel comprises determining to deallocate said remaining number of time slots from said circuit-switched first channel if said request is a request for a time slot to be allocated to another channel with a higher level of priority than said selected level of priority.

5. A method as claimed in claim 1, wherein said determining whether or not to deallocate the remaining number of requested time slots from said circuit-switched first channel comprises determining to deallocate said time slot from said channel only if said selected level of priority is lower than a highest level of priority.

6. A method as claimed in claim 1, wherein said determining whether or not to deallocate the remaining number of requested time slots from said circuit-switched first channel is further based upon an evaluation regarding to which channel a time slot was last allocated.

7. A method as claimed in claim 1, wherein said determining whether or not to deallocate the remaining number of requested time slots from said circuit-switched first channel is further based upon an evaluation regarding to which channel a time slot has been allocated the longest period of time.

8. A method as claimed in claim 1, wherein said determining whether or not to deallocate the remaining number of requested time slots from said circuit-switched first channel is further based upon an evaluation regarding from which channel a time slot was last deallocated.

9. A method as claimed in claim 1, wherein said determining whether or not to deallocate the remaining number of requested time slots from said circuit-switched first channel is further based upon an evaluation regarding from which channel a time slot should be deallocated in order to counteract time slot fragmentation on the bitstream.

10. A method as claimed in claim 1, wherein said associating comprises associating the allocation of all time slots allocated to said circuit-switched first channel with the same selected level of priority.

11. A method as claimed in claim 1, wherein said associating comprises associating said circuit-switched first channel with said selected level of priority, thereby associating each time slot allocated to said channel with the same selected level of priority.

12. A method as claimed in claim 1, wherein said associating comprises associating different time slots allocated to said circuit-switched first channel with different levels of priority.

13. A method as claimed in claim 1, wherein said associating comprises associating time slots allocated to said circuit-switched first channel over a first portion of said network with a selected level of priority and associating time slots allocated to said circuit-switched first channel over another portion of said network with another selected level of priority.

14. A method as claimed in claim 1, wherein said associating comprises changing the level of priority associated with a time slot allocated to said circuit-switched first channel.

15. A method as claimed in claim 1, comprising determining the priority by which said circuit-switched first channel is to be re-established in case of channel failure based upon said selected level of priority.

16. A method as claimed in claim 1, comprising determining a degree of redundancy requested for said circuit-switched first channel based upon said selected level of priority.

17. A method as claimed in claim 1, wherein said associating comprises selecting said selected level of priority based upon the identity of a physical or virtual port or interface to/from which traffic pertaining to said circuit-switched first channel is delivered.

18. A method as claimed in claim 1, wherein said associating comprises selecting said selected level of priority based upon an identification of the type of application that traffic to be transported in said circuit-switched first channel pertains to.

19. A method as claimed in claim 1, wherein said associating comprises selecting said selected level of priority based upon priority information derived from overlying network protocols.

20. A method as claimed in claim 1, comprising transmitting information on said selected level of priority associated with said time slot to at least one other node of the network in order for said at least one other node to be able to switch said circuit-switched first channel taking said level of priority into consideration.

21. A method as claimed in claim 1, further comprising:
upon receiving a rejection from the next node, relieving the pre-reserved slots and sending a rejection to the requester.

22. A method as claimed in claim 1, further comprising:
upon receiving a rejection from the next node, forwarding the request to a different node.

* * * * *